US005282302A

United States Patent [19]

Starks et al.

[11] Patent Number: 5,282,302

[45] Date of Patent: Feb. 1, 1994

[54] SUCKER ROD GUIDE CLAMPING DEVICES

[76] Inventors: Jimmy A. Starks, 1828 Palmetto Rd.; Billy J. Edwards, 601 Oak Ridge, both of Benton, La. 71006

[21] Appl. No.: 976,479

[22] Filed: Nov. 16, 1992

[51] Int. Cl.[5] .................... B23P 19/04

[52] U.S. Cl. .................... 29/268; 269/902

[58] Field of Search .................... 81/424, 426, 352, 354, 81/353; 29/268; 269/902

[56] References Cited

U.S. PATENT DOCUMENTS 753,374 3/1904 De Vilbiss .................... 81/353
4,149,435 4/1979 Smith .
4,353,273 10/1982 Freberg .
4,697,483 10/1987 Rodgers .
5,014,578 5/1991 Flentge .
5,022,292 6/1991 Hammer et al. .

FOREIGN PATENT DOCUMENTS 657559 9/1986 Switzerland .................... 29/268

*Primary Examiner*—Robert C. Watson
*Attorney, Agent, or Firm*—John M. Harrison

[57] ABSTRACT

Sucker rod guide clamping devices which in a first embodiment include a scissor clamping device provided with a pair of pivotally-disposed clamping jaws pivotally attached to corresponding pivoting jaw arms. One of the clamping jaws is provided with a projecting plate for engaging a sucker rod and the oppositely-disposed clamping jaw includes a pair of engaging flanges for receiving and seating a slotted sucker rod guide, wherein the sucker rod guide is installed on the sucker rod by pressure applied to the jaw arms. In a second embodiment a piston clamping device includes a C-shaped frame, in which is mounted a fluid cylinder, with a pair of engaging flanges provided in the frame for receiving a sucker rod guide and a fluid cylinder piston adapted to engage a sucker rod. Operation of the fluid cylinder extends the piston, forces the sucker rod into the sucker rod guide slot and installs the sucker rod guide on the sucker rod.

7 Claims, 2 Drawing Sheets

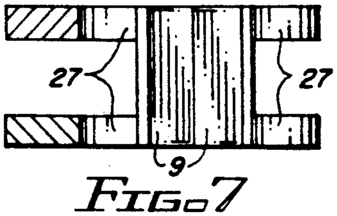
FIG. 7
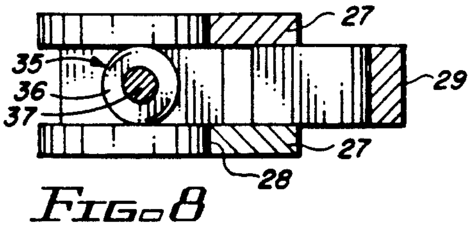
FIG. 8
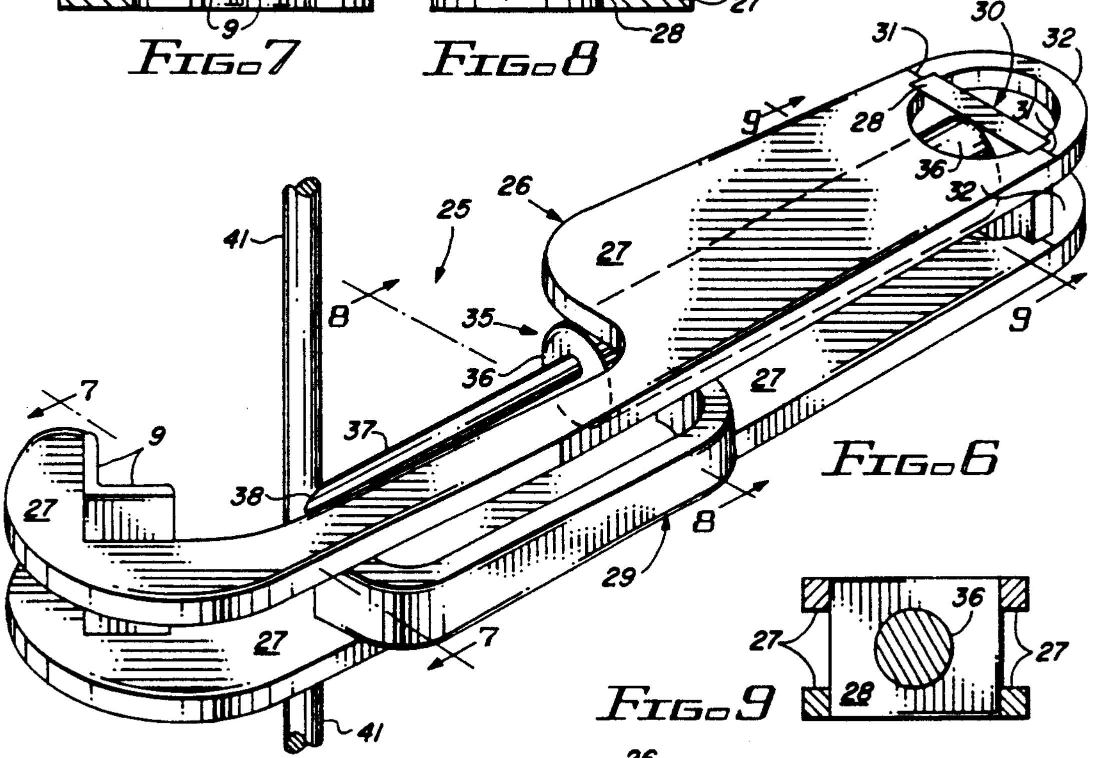
FIG. 6
FIG. 9
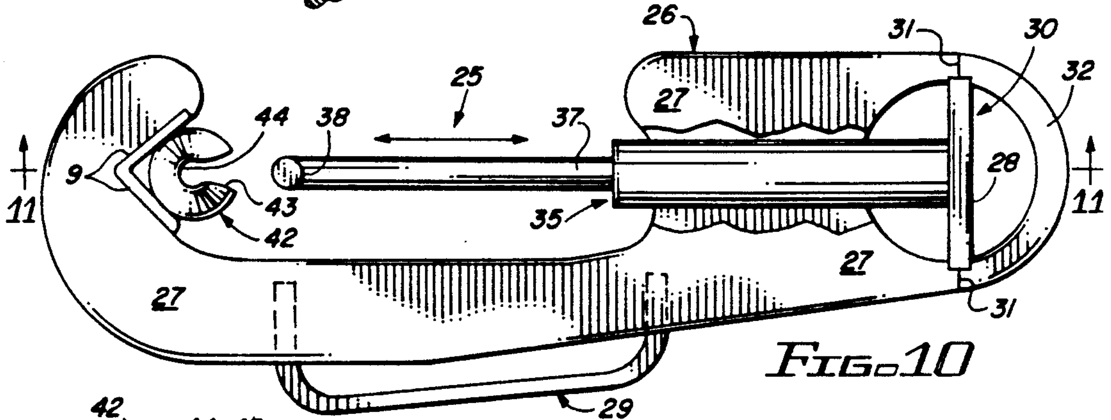
FIG. 10
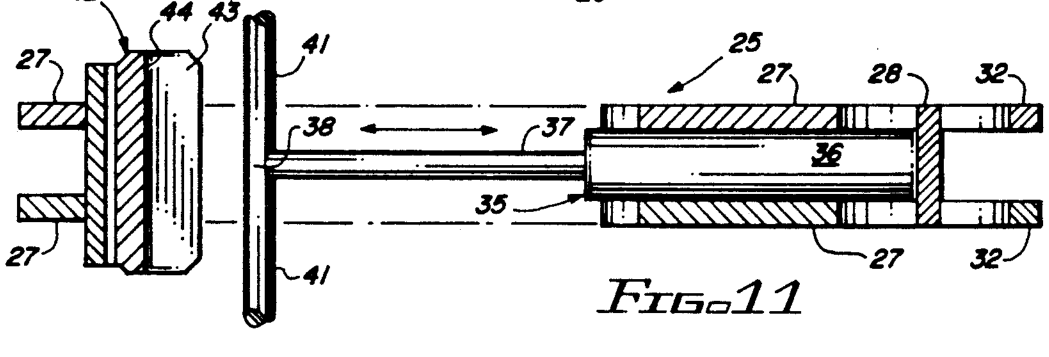
FIG. 11

SUCKER ROD GUIDE CLAMPING DEVICES

BACKGROUND OF THE INVENTION

1. Field of the Invention

This invention relates to sucker rod guides mounted on sucker rods for spacing the sucker rods from well tubing while pumping oil from a well. More particularly, the invention relates to clamping devices for attaching slotted sucker rod guides to sucker rods in a fast and efficient manner. In a first preferred embodiment of the invention the clamping device is characterized by a scissor clamping apparatus which includes a pair of pivotally disposed jaws, one of which is fitted with a concave jaw insert for engaging the sucker rod and the other having a V-shaped engaging seat shaped by a pair of flanges, for receiving and seating a slotted sucker rod guide. A pair of elongated arms are pivotally attached to each other and to the clamping jaws, such that pressure applied to the arms forces the sucker rod into the slot provided in the sucker rod guide and installs the sucker rod guide on the sucker rod. In a second preferred embodiment the sucker rod guide clamping device is characterized by a piston-operated clamping device that includes a generally C-shaped frame, one end of which is fitted with a V-shaped engaging seat. A fluid-operated cylinder is mounted in the frame with the piston facing the engaging seat and the cylinder piston is shaped to engage the sucker rod, force the sucker rod into the slot in the sucker rod guide and mount the sucker rod guide on the sucker rod.

2. Description of the Prior Art

One of the problems encountered in mounting slotted plastic sucker rod guides on sucker rods in the oil field is the minimal resiliency of the sucker rod guides, especially in cold weather. In a typical application, the sucker rod guides are positioned with the guide slots located adjacent to the sucker rod and the guides are sharply struck with a hammer, mallet or other tool to momentarily "spring" the walls of the sucker rod guide slot and force the sucker rod into the sucker rod guide bore. This procedure is not recommended because of the possibility of the impact fracturing the rod, which could cause the rod to part at a later time due to the down-hole stresses in the producing operation.

U.S. Pat. No. 4,149,435, dated Apr. 17, 1979, to Gordon E. Smith, details a "Key Slug Knockout Tool" which includes a pair of jaws mounted on handles pivotally connected adjacent to the jaws. One jaw has a seat to locate the end portion of the head of a key which is positioned beyond the slug and the other jaw having a pair of spaced lugs positioned to straddle the key ring and engage the opposite portions of the slug that are on opposite sides of the hole in the slug, to punch the slug from head of the key when the jaws are moved toward each other. Pliers for plastic radiator tank replacement are detailed in U.S. Pat. No. 4,353,273, dated Oct. 12, 1982, to Gerald A. Freberg. The pliers include a special hook-configured jaw adapted to grip and bend separate tabs on a radiator header. The pliers for reattaching the header plate includes opposed identical jaws, each having a concave, arcuate face adapted to engage and close separate locking tabs. U.S. Pat. No. 4,697,483, dated Oct. 6, 1987, to Herman R. Rodgers, details a tool for attaching and detaching a spring clip from a shaft. The tool includes two jaws, the first having a seat for receiving a shaft, to which a split ring clip is to be attached or detached. The second jaw includes a head with two selected indexed positions, the first positioned for detaching the clip and having prongs adapted to contact the ends of the clip and the second positioned for attaching the clip and including a seat for holding the clip with its open side facing the first jaw. The tool also includes a receptacle to catch tile clip when detached and a mechanism for moving the jaws together in a meshing relationship. Pipe tongs are detailed in U.S. Pat. No. 5,014,578, dated May 14, 1991, to Melvin L. Flentge. The pipe tongs include a fixed handle having a removable pipe clamp at one end and an adjustable screw at the other end. A movable jaw member with a removable pipe clamp is provided at one end thereof and a movable handle is connected to the movable jaw member at one end and has a latch with an operating lever at the other end. A linkage is connected between the movable handle and the adjustment screw to provide an adjustable toggle or locking mechanism for the handles and movable jaw member of the tongs. A catch on the fixed handle is engaged by the latch to secure tile movable handle in a locked, closed position. A tool for installation of clip is detailed in U.S. Pat. No. 5,022,292, dated Jun. 11, 1991, to Russell C. Hammer, et al. The tool is characterized by a plier-type hand tool for assembling a cable fitting to a manually-operable gearshift mechanism by means of a spring metal clip retainer. The tool includes adjustable "channel lock" type jaws for engaging a cable and fitting.

The sucker rod guide clamping devices of this invention eliminate the requirement of striking the sucker rod guide, in favor of clamping the sucker rod guide on the sucker rod. The mechanism by which this is accomplished is dual jaws in the scissor clamping device and the fluid-operated piston in the piston clamping device.

It is therefore an object of this invention to provide sucker rod clamping devices for clamping slotted sucker rod guides on sucker rods.

Another object of the invention is to provide a scissor clamping device having a pair of pivoted clamping jaws, one of which jaws engages the sucker rod and the other of which engages the sucker rod guide, with pivotally connected arms pivotally attached to the jaws for forcing the jaws together and clamping the sucker rod guide on the sucker rod.

Yet another object of this invention is to provide a scissor clamping device for attaching slotted sucker rod guides to sucker rods, which scissor clamping device includes a pair of pivoted clamping jaws, one of which is fitted with a concave jaw insert for engaging a sucker rod and the other with a V-shaped pair of engaging flanges for receiving and seating a sucker rod guide, wherein closing of the jaws forces the sucker rod into the slot provided in the sucker rod guide.

Still another object of this invention is to provide a piston clamping device for securing a sucker rod in a slotted sucker rod guide, which piston clamping device includes a C-shaped frame provided with a fluid-operated cylinder having a piston shaped for engaging the sucker rod, the frame also provided with V-shaped engaging flanges for seating the sucker rod guide, such that operation of the fluid-operated cylinder extends the piston and forces the sucker rod into the slotted sucker rod guide.

SUMMARY OF THE INVENTION

These and other objects of the invention are provided in new and improved sucker rod guide clamping devices which in a first preferred embodiment include a scissor clamping device having a pair of pivotally-mounted jaws operated by pivoting arms, one of which jaws is fitted with a concave insert for engaging a sucker rod and the other with a pair of V-shaped engaging flanges for receiving and seating a slotted sucker rod guide, wherein the sucker rod is forced into the slot provided in the sucker rod guide responsive to closure of the jaws under pressure applied to the arms. In a second preferred embodiment a piston clamping device is designed with a C-shaped frame, one end of which is fitted with a pair of V-shaped engaging flanges and the other end receiving a fluid-operated cylinder having a cylinder piston facing the engaging flanges and designed to engage the sucker rod, wherein operation of the fluid-operated cylinder forces the cylinder piston and sucker rod toward the slot in a sucker rod guide seated in the engaging flanges, such that the sucker rod is forced into the sucker rod guide slot to mount the sucker rod guide on the sucker rod.

BRIEF DESCRIPTION OF THE DRAWINGS

The invention will be better understood by reference to the accompanying drawings, wherein:

FIG. 6 is a perspective view of a piston clamping device of this invention;

FIG. 7 is a sectional view taken along line 7—7 of the piston clamping device illustrated in FIG. 6;

FIG. 8 is a sectional view taken along line 8—8 of the piston clamping device illustrated in FIG. 6;

FIG. 9 is a sectional view taken along line 9—9 of the piston clamping device illustrated in FIG. 6;

FIG. 10 is a side sectional view of the piston clamping device illustrated in FIG. 6; and FIG. 11 is a sectional view taken along line 11—11 of the piston clamping device illustrated in FIG. 10.

DESCRIPTION OF THE PREFERRED EMBODIMENTS

Figure 1:
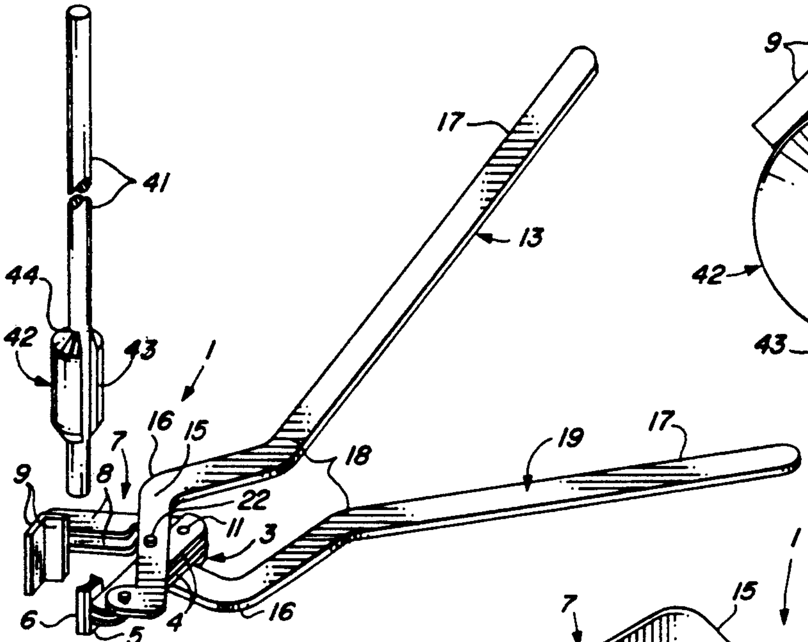
FIG. 1 is a perspective view of a scissor clamping device of this invention.

Referring initially to FIGS. 1-5 of the drawings, a scissor clamping device is generally illustrated by reference numeral 1. The scissor clamping device 1 is characterized by a pair of pivoted clamping jaws defined by a sucker rod jaw 3 and a rod guide jaw 7. The sucker rod jaw 3 includes a pair of flat sucker rod jaw plates 4 having an extension 5 projecting inwardly from one end thereof and an extension insert 6 secured to the end of the plate extension 5, as illustrated in FIGS. 1-4. The oppositely-disposed rod guide jaw 7 includes a pair of rod guide jaw plates 8, fitted with a pair of engaging flanges 9 which form a "V" at one end thereof opposite the extension insert 6 and plate extension 5 of the sucker rod jaw plate 4. The opposite ends of the sucker rod jaw plates 4 and rod guide jaw plates 8 are pivotally attached by means of a jaw pivot pin 11, as further illustrated in FIGS. 1, 2, 4 and 5. The frontal arm segment 15 of a sucker rod jaw arm 13 is pivotally attached to the sucker rod jaw plates 4 of the sucker rod jaw 3 by means of an arm mount pin 14, as also illustrated in FIGS. 1, 2, 4 and 5. The sucker rod jaw arm 13 further includes a rear arm segment 17, extending from a frontal arm bend 16 shaped in the frontal arm segment 15 and having a rear arm bend 18. Similarly, a rod guide jaw arm 19 is provided with a frontal arm segment 15 which is pivotally attached to the rod guide jaw plates 8 of the rod guide jaw 7 by means of a second arm mount pin 14. Like the sucker rod jaw arm 13, the rod guide jaw arm 19 is shaped to define a frontal arm bend 16, such that the rear arm segment 17 extends in spaced relationship from the corresponding arm bend 16 and has a rear arm bend 18. The respective frontal arm segments 15 of the sucker rod jaw arm 13 and rod guide jaw arm 19 are pivotally connected between the rod guide jaw plates 8 and the sucker rod jaw plates 4 by means of an arm connecting bolt 22 and corresponding nut 23, as further illustrated in FIGS. 1 and 2. A pair of plate slots 20 are provided in oppositely-disposed relationship in the sucker rod jaw plates 4 and rod guide jaw plates 8 opposite the arm connecting bolt 22, to accommodate the arm connecting bolt 22 when the clamping jaws 2 are closed by application of pressure on the respective rear arm segments 17 of the sucker rod jaw arm 13 and rod guide jaw arm 19, as hereinafter further described.

Figure 3:
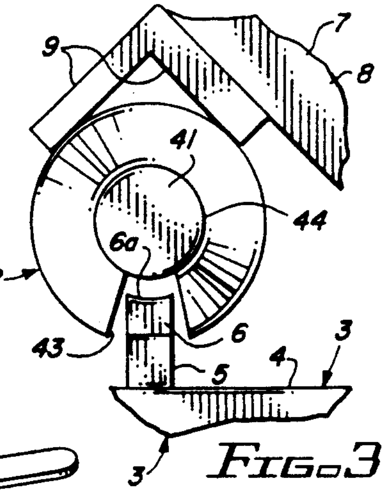
FIG. 3 is an enlarged view of plate extension and engaging flange components of the scissor clamping device illustrated in FIG. 1.
Figure 2:
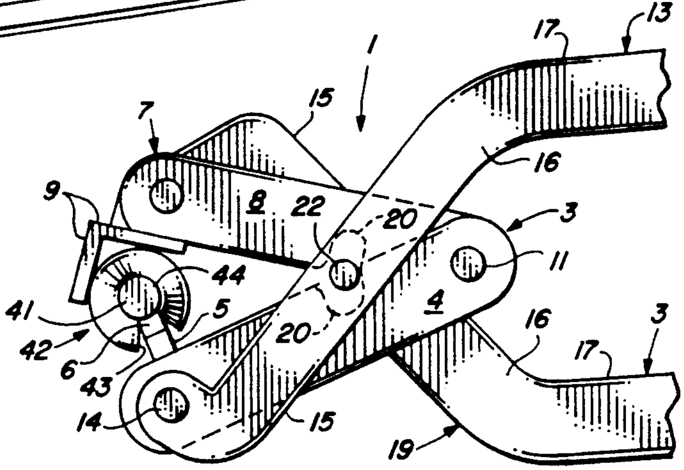
FIG. 2 is a top view, partially in section of the jaw portion of the scissor clamping device illustrated in FIG. 1.
Figure 4:
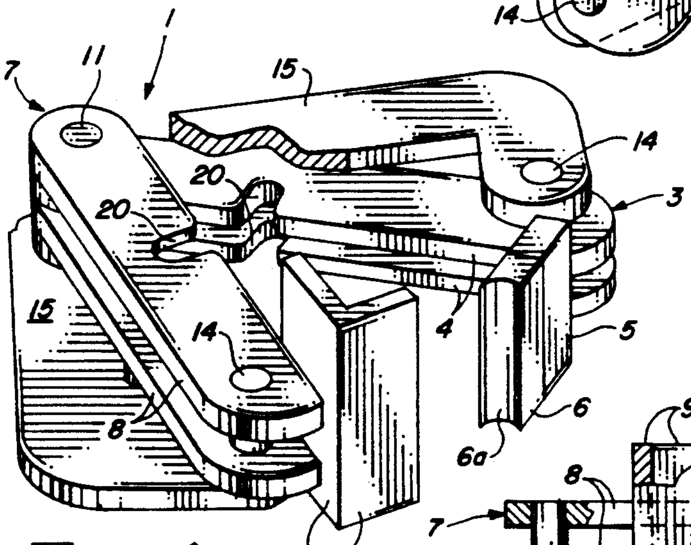
FIG. 4 is an enlarged perspective view of the jaw portion of the scissor clamping device illustrated in FIG. 1.
Figure 5:
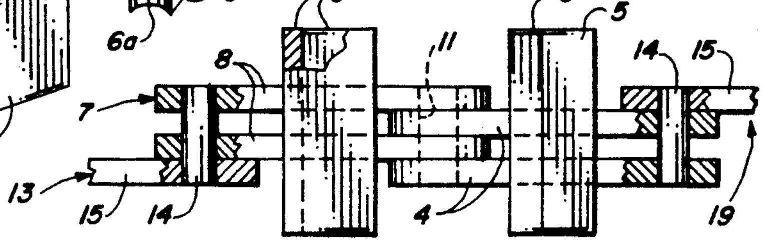
FIG. 5 is an end view of the jaw portion of the scissor clamping device illustrated in FIG. 1.

As further illustrated in FIGS. 2 and 3 of the drawings, when it is desired to secure a sucker rod guide 42 on an elongated sucker rod 41 as illustrated in FIG. 1, the sucker rod guide 42 is first seated against the V-shaped engaging flanges 9 of the rod guide jaw 7 with the guide slot 43 and guide bore 44 facing the arm connecting bolt 22. The scissor clamping device 1 is then oriented with the sucker rod 41 extending between the sucker rod jaw 3 and rod guide jaw 7, such that the curved insert seat 6a of the extension insert 6 engages the sucker rod 41. Pressure applied to the rear arm segments 17 of the sucker rod jaw arm 13 and rod guide jaw arm 19 then closes the sucker rod jaw 3 and rod guide jaw 7, such that the sucker rod 41 approaches the guide slot 43, ultimately engages the guide slot 43 and is inserted in the guide bore 44 of the sucker rod guide 42 by clamping pressure exerted by the clamping jaws 2. Release of pressure on the rear arm segments 17 again opens the clamping jaws 2 and the sucker rod 41, with the sucker rod guide 42 mounted thereon as illustrated in FIG. 1, is removed from the scissor clamping device 1.

Referring now to FIGS. 6-11 of the drawings, a piston clamping device is generally illustrated by reference numeral 25. The piston clamping device 25 includes a C-shaped frame 26, formed by parallel frame plates 27 and fitted with a pair of engaging flanges 9, shaped in a "V" configuration at one end and receiving a fluid cylinder 35 at the opposite end. The fluid cylinder 35 includes a cylinder housing 36 that receives a piston 37, having a curved piston seat 38 shaped in the extending end thereof. The piston seat 38 is designed to engage the round sucker rod 31 as illustrated in FIGS. 6, 10 and 11, while a sucker rod guide 42 is seated in the V-shaped engaging flanges 9 with the guide slot 43 and the guide bore 44 facing the sucker rod 41 and piston 37. In a most preferred embodiment of the invention the fluid cylinder 35 further includes a rectangular cylinder base plate 28, which spans the parallel frame plates 27 that form the frame 26. The engaging flanges 9 are also welded to the frame plates 27 and a handle 29 is welded or otherwise attached to the frame plates 27 for carrying the piston clamping device 25, as further illustrated in FIGS. 6 and 10. A pair of frame end members 32 are welded to the ends of the frame plates 27 at a weld line 31 to define a frame opening 30 that receives the cylinder base plate 28. Accordingly, in operation, activation of the fluid cylinder 35 by pumping hydraulic fluid, air or other fluid into the cylinder housing 36 in conventional fashion forces the piston 37 and the sucker rod 41, which is seated in the piston seat 38 of the piston 37, toward the sucker rod guide 42, seated in the "V" defined by the engaging flanges 9, as illustrated in FIGS. 6, 10 and 11. Continued extension of the piston 37 causes the sucker rod 41 to engage the sucker rod guide 42 at the guide slot 43 and forces the sucker rod 41 through the guide slot 43 and into the guide bore 44. The piston 37 is then either manually retracted into the cylinder housing 36, in the case of a single-action fluid cylinder 35, or automatically retracted, in the case of a double-action fluid cylinder 35, according to techniques known to those skilled in the art. The sucker rod 41, with the sucker rod guide 42 mounted thereon, is then removed from the C-shaped frame 26 of the piston clamping device 25.

It will be appreciated by those skilled in the art that a primary feature of the sucker rod guide clamping devices of this invention is the facility for engaging a sucker rod by a first clamping element, seating a sucker rod guide 42 in a second clamping element and forcing the sucker rod 41 through the sucker rod guide slot 43 into the guide bore 44 of the sucker rod guide 42 by movement of at least one of the clamping elements. Under circumstances where this facility is effected by the piston clamping device 25, in a most preferred embodiment of the invention, the fluid cylinder 35 of the piston clamping device 25 is a single-action cylinder and may therefore be operated by hydraulic fluid, air or or other suitable fluid known to those skilled in the art for initially applying pressure on the piston 37 and subsequently releasing this pressure after the sucker rod 41 is seated in the guide bore 44 of the sucker rod guide 42. Alternatively, double-action cylinders may be utilized, as desired, to achieve the same purpose, depending upon the desires of those skilled in the art and cost considerations.

It will be further appreciated that the sucker rod guide clamping devices of this invention may be utilized to mount slotted sucker rod guides of any description, including nylon, polyethylene and other "plastic" sucker rod guides, which are of the tapered slot design. Both the scissor clamping device and the piston clamping device are designed to quickly and efficiently secure a sucker rod guide on a sucker rod in an efficient, safe, and expedient manner in any weather.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A clamping device for clamping a sucker rod guide having a longitudinal slot on a sucker rod, comprising at least one first jaw plate and at least one second jaw plate; pivotally connected arm means pivotally carried by said first and second jaw plate for selectively opening and closing said first and second jaw plate; a plate extension carried by one end of said first jaw plate for engaging the sucker rod; and seat means carried by one end of said second jaw plate for receiving the sucker rod guide, whereby the sucker rod is forced into the longitudinal slot of the sucker rod guide responsive to closure of said first and second jaw plate by pressure applied to said arm means.

2. The clamping device of claim 1 wherein said arm means further comprises a first arm pivotally connected to said first clamping jaw means; a second arm pivotally connected to said second clamping jaw means; and arm pivot means connecting said first arm and said second arm in pivoting relationship.

3. The clamping device of claim 1 further comprising an insert attached to said plate extension for contacting the sucker rod.

4. The clamping device of claim 1 wherein said seat means further comprises a generally V-shaped engaging member provided on said second clamping jaw means for receiving and seating the sucker rod guide.

5. The clamping device of claim 1 further comprising an insert attached to said plate extension for contacting the sucker rod and wherein said seat means further comprises a generally V-shaped engaging member provided on said second clamping jaw means for receiving and seating the sucker rod guide.

6. The clamping device of claim 1 further comprising an insert attached to said plate extension and a concave engaging surface provided in said insert for contacting the sucker rod.

7. A clamping device for seating a sucker rod in the slotted longitudinal bore of a sucker rod guide, comprising at least one first jaw plate, at least one second jaw plate having a pivot end lying adjacent to one end of said first jaw plate; a jaw pivot pin extending through said one end of said first jaw plate and said pivot end of said second jaw plate for connecting said first jaw plate and said second jaw plate in pivoting relationship; a plate extension provided on the opposite end of said first jaw plate from said one end for engaging the sucker rod; a guide seat provided on the opposite end of said second jaw plate from said pivot end for receiving the sucker rod guide, with the slotted longitudinal bore of said sucker rod guide facing said plate extension and the sucker rod; a first arm having one end engaging said opposite end of said first jaw plate and a first arm pin pivotally connecting said one end of said first arm to said opposite end of said first jaw plate; a second arm having one end engaging said opposite end of said second jaw plate and a second arm pin pivotally connecting said one end of said second arm to said opposite end of said second jaw plate; and a connecting pin pivotally connecting said first arm and said second arm between said first jaw plate and said second jaw plate, whereby the sucker rod is forced into the slotted longitudinal bore of the sucker rod guide responsive to pivoting of said first jaw plate and said second jaw plate on said jaw pivot pin and said first arm and said second arm on said connecting pin, by pressure applied to said first arm and said second arm.

* * * * *